United States Patent [19]
Kishi et al.

[11] Patent Number: 5,616,405
[45] Date of Patent: Apr. 1, 1997

[54] CLOTH PREPREG, PROCESS FOR PRODUCING THE SAME AND REINFORCING FABRIC

[75] Inventors: Hajime Kishi; Nobuyuki Odagiri; Tokuo Tazaki; Hideo Nagata; Takeshi Terashita; Akira Nishimura, all of Iyo-gun; Hiroyasu Kato, Otsu, all of Japan

[73] Assignee: Toray Industries, Inc., Tokyo, Japan

[21] Appl. No.: 368,671

[22] Filed: Jan. 4, 1995

Related U.S. Application Data

[60] Division of Ser. No. 88,635, Jul. 9, 1993, Pat. No. 5,447,785, which is a continuation-in-part of Ser. No. 24,957, Mar. 2, 1993, abandoned.

[30] Foreign Application Priority Data

Mar. 2, 1992 [JP] Japan .................................. 4-80522

[51] Int. Cl.$^6$ ........................................... B32B 5/16
[52] U.S. Cl. ........................... 442/60; 442/175; 442/179
[58] Field of Search ................................. 428/272, 240, 428/260

[56] References Cited

U.S. PATENT DOCUMENTS

| | | | |
|---|---|---|---|
| 4,237,175 | 12/1980 | Kobayashi | 428/192 |
| 4,977,215 | 12/1990 | Gardner et al. | 525/119 |
| 5,217,796 | 6/1993 | Kasai et al. | 428/229 |

FOREIGN PATENT DOCUMENTS

| | | |
|---|---|---|
| 0262891 | 4/1988 | European Pat. Off. |
| 0351028 | 1/1990 | European Pat. Off. |
| 0434013 | 6/1991 | European Pat. Off. |
| 2825191 | 1/1979 | Germany |

OTHER PUBLICATIONS

Database WPIL, Derwent Publications Ltd., London, GB: AN 90-258317[34] & JP-A-2 182 409 Matsushita Elec. Works 17 Jul. 1990 (Abstract).

Catalog from Nitto Boseki Co., Ltd. (1989).

JIS R 3413 (1963).

*Primary Examiner*—Christopher Raimund
*Attorney, Agent, or Firm*—Fish & Richardson PC

[57] ABSTRACT

Disclosed is a prepreg which is suited for preparing honeycomb sandwich panels, by which the formation of pores in the interlayer zones in the cured composite can be reduced. The prepreg of the present invention comprises a resin composition including an epoxy resin, a curing agent and a solid rubber, and a woven fabric made of reinforcing fibers, the meshes of the woven fabric being crushed such that said prepreg has a cover factor $K_p$ of 97–99.9%. Also disclosed is a reinforcing fabric comprising warps and woofs which are multifilament yarns made of carbon fibers, the widths W (mm) and finenesses D (d:denier) of the warp and woof satisfying the equation of:

$$W = k \cdot (D/\rho)^{5/9}$$

(wherein k represents $3.5 \times 10^{-2} – 10.0 \times 10^{-2}$ (mm·d$^{-5/9}$) and $\rho$ represents specific gravity of said carbon fibers), the woven fabric having a cover factor $K_c$ of 90.0–99.8%.

16 Claims, 6 Drawing Sheets

CLOTH PREPREG, PROCESS FOR PRODUCING THE SAME AND REINFORCING FABRIC

CROSS REFERENCE TO THE RELATED APPLICATION

This application is a division of U.S. application Ser. No. 08/088,635 filed Jul. 9, 1993, now U.S. Pat. No. 5,447,785 which is a continuation-in-part application of Ser. No. 08/024,957 filed on Mar. 2, 1993, now abandoned.

BACKGROUND OF THE INVENTION

1. Field of the Invention

The present invention relates to a cloth prepreg and process for producing the same. More particularly, the present invention relates to a cloth prepreg which gives a fiber-reinforced plastic (hereinafter also referred to as "FRP") having high toughness and high modulus of elasticity as well as high thermal resistance, low water absorption and good solvent resistance, and which hardly forms pores in the FRP plate prepared by the so called honeycomb co-curing using the prepreg, and to a prepreg which gives an FRP having a good burn-through property.

2. Description of the Related Art

Epoxy resins are widely used in various industrial fields as molded articles, laminated articles, adhesives, sealants and the like exploiting their excellent mechanical properties, high chemical resistances and the like. Fiber-reinforced composite materials which have reinforcing fibers and matrix resins as indispensable constituents are used as structural materials of airplanes, automobiles and the like, and epoxy resins are widely used therein. Particularly, carbon fiber-reinforced plastics (CFRP) are conventionally used as structural materials of airplanes. To reduce the weight of the airplanes, honeycomb sandwich panel structure is often employed. The honeycomb sandwich panel structure is prepared by laying up prepregs on both sides of a honeycomb core made of aramide paper or the like (in some cases, via adhesive films), and the curing of the prepregs and the adhesion of prepregs to the honeycomb core are simultaneously carried out (this curing is called honeycomb co-curing). Thus, good co-curing properties are demanded for the prepregs.

It is also demanded that pores be not formed in the FRPs of the honeycomb sandwich panel. Since no pressure is applied to the regions of the prepregs on and under the inner space of the hexagonal cells in the honeycomb core, pores are likely to be formed in the interlayer zones and within one prepreg layer. If a molded plate having such pores are used to constitute a spoiler of an airplane, water is accumulated in the pores and when the airplanes flies at high altitude, the water is frozen to crack the skin (i.e., FRP of the sandwich panel). By repeating this, water comes to enter the honeycomb core and the physical properties of the panel is degraded, so that safe operation of the airplane is jeopardized. In other words, if the porosity of the FRPs are high, the reliability as a fiber-reinforced composite material is degraded.

There is the following prior art concerning the prepreg employing carbon fibers as reinforcing fibers and concerning matrix resins, which are designed to be used for the honeycomb co-curing.

Japanese Patent Publication (Kokoku) Nos. 63-30925 and 1-29814 disclose the following epoxy resin composition by which good direct adhesion between the prepregs and the honeycomb core and good composite properties of the cured plate as a surface material, especially, high interlayer shearing strength (ILSS) are attained. That is, as the epoxy resin, three types of epoxy resins, that is, bisphenol A type, novolak type and glycidylamine type are selected. The resin composition further comprises a reaction product between liquid butadiene-acrylonitrile copolymer having carboxyl groups at both ends and a glycidylamine type epoxy resin, as well as nitrile rubber and dicyandiamide as a curing agent. The content of each component is made within a prescribed range by which the above-mentioned properties are stated to be attained. Japanese Patent Publication (Kokoku) No. 62-28167 discloses as a matrix resin suited for hybrid reinforcing fibers including carbon fibers and aromatic polyamide fibers, a composition comprising an epoxy resin, a reaction product between liquid butadiene-acrylonitrile copolymer having carboxyl groups at both ends and an epoxy resin, and dicyandiamide, as well as liquid or semi-solid polyamide having amino group at its end. Japanese Laid-open Patent Application (Kokai) Nos. 58-82755, 58-83022 and 58-83031 disclose that by employing a composition containing a reaction product between liquid butadiene-acrylonitrile copolymer having carboxyl groups at both ends and an epoxy resin, and both dicyandiamide and diaminodiphenylsulfone as curing agents, direct adhesion between the prepregs and the honeycomb core is promoted, especially at a high temperature.

Japanese Laid-open Patent Application (Kokai) Nos. 57-21427 and 57-21450 disclose that a prepreg prepared by impregnating into fibers a resin solution obtained by dissolving a composition containing an epoxy resin, a reaction product between liquid butadiene-acrylonitrile copolymer having carboxyl groups at both ends and an epoxy resin, nitrile rubber and a curing agent represented by dicyandiamide, in acetone-methyl Cellosolve mixed solvent or the like gives excellent adhesion strength, high impact strength and high bending strength to the honeycomb sandwich panel.

Japanese Laid-open Patent Application (Kokai) No. 57-49646 discloses that a prepreg employing a resin composition comprising an epoxy resin, nitrile rubber and a high molecular epoxy resin having a molecular weight of not less than 10,000 exhibits good direct adhesion to the honeycomb core, so that it gives high adhesion strength and high bending strength to the honeycomb sandwich panel. In the examples thereof, dicyandiamide is used as a curing agent and prepregs are prepared by dissolving the composition in acetone-methyl Cellosolve mixed solvent or the like.

Japanese Laid-open Patent Application (Kokai) No. 58-84825 discloses a prepreg in which an epoxy resin composition containing a bisphenol A type epoxy resin, an urethane-modified epoxy resin, an epoxy resin having N,N-diglycidylamino group, a brominated bisphenol A type epoxy resin and dicyandiamide is impregnated. It is described that the honeycomb sandwich panel employing this prepreg has excellent high heel resistance and high bending strength.

However, the above-mentioned prior art does not aim at reducing the porosity in the interlayer zones.

Further, if diaminodiphenyl sulfone alone is used as a curing agent which gives high thermal resistance, pores are much more easily formed in the interlayer zones than in cases where dicyandiamide is used as a curing agent, and this problem is very difficult to solve.

SUMMARY OF THE INVENTION

Accordingly, an object of the present invention is to provide a prepreg which hardly forms pores in the cured FRP plates even when diaminodiphenylsulfone is used as a curing agent, which gives an FRP having high toughness and high modulus of elasticity as well as high thermal resistance, low water absorption and good solvent resistance, which has good tackiness and drapability and which gives an FRP having a good burn-through property, that is, a property to prevent the penetration of flame during fire, that is important for interior materials.

Another object of the present invention is to provide a reinforcing woven fabric having an excellent uniformity of the opening, width-enlarging and flattening of the yarns, in which the bending of yarns at intersections is small so that breakage of the fibers is substantially avoided, which has an excellent surface smoothness so that the problems due to the uneven distribution of the carbon fibers can be avoided, and with which a carbon fiber-reinforced plastic (CFRP) having an excellent drapability, physical properties and reliability can be prepared.

The present invention provides a cloth prepreg comprising a resin composition including an epoxy resin, a curing agent and a solid rubber, and a woven fabric made of reinforcing fibers, the meshes of said woven fabric being crushed such that said prepreg has a cover factor $K_p$ of 97–99.9%.

The present invention also provides a process of producing the cloth prepreg, comprising impregnating the resin composition containing a solid acrylonitrile-butadiene rubber having a functional group and a weakly cross-linked structure into the woven fabric in two steps, wherein in the first impregnation step, the resin composition is impregnated so as to attain a resin content $W_R$ of 10–30%.

The present invention further provides a process of producing the cloth prepreg, comprising the step of impregnating a resin composition containing an epoxy resin, a curing agent and a solid acrylonitrile-butadiene rubber having a functional group and not having a cross-linked structure into a woven fabric having warps and woofs which are multifilament yarns made of carbon fibers, the widths W (mm) and finenesses D (d:denier) of said warps and woofs satisfying the equation of:

$$W = k \cdot (D/\rho)^{5/9}$$

(wherein k represents $3.5 \times 10^{-2} – 10.0 \times 10^{-2}$ (mm·d$^{-5/9}$) and $\rho$ represents specific gravity of said carbon fibers), said woven fabric having a cover factor $K_c$ of 90.0–99.8%.

The present invention still further provides a reinforcing fabric comprising warps and woofs which are multifilament yarns made of carbon fibers, the widths W (mm) and finenesses D (d:denier) of said warp and woof satisfying the equation of:

$$W = k \cdot (D/\rho)^{5/9}$$

(wherein k represents $3.5 \times 10^{-2} – 10.0 \times 10^{-2}$ (mm·d$^{-5/9}$) and $\rho$ represents specific gravity of said carbon fibers), said woven fabric having a cover factor $K_c$ of 90.0–99.8%.

The present invention still further provides a process for producing the reinforcing fabric of the present invention, comprising the step of treating said fabric with water jets from a nozzle apparatus having nozzle holes with an inner diameter of 0.05–0.5 mm and a pitch of not more than ⅓ of the warp pitch, the punching force of said water jets at the surface of said fabric being 0.1–3 gf per one water jet, the warps and woofs of said fabric being twisted to not more than 5 turns/m, the size of the mesh of said fabric being at least ⅕ of the width of said warps.

The present invention still further provides a prepreg comprising the above-described reinforcing fabric according to the present invention and a thermoplastic matrix resin.

The cloth prepreg of the present invention does not substantially forms pores in the cured FRP plates when subjected to honeycomb co-curing, and gives FRP having high toughness, high modulus of elasticity, as well as high thermal resistance, low water absorption and high solvent resistance. The prepreg also has good tackiness and drapability. Further, the cloth prepreg gives an FRP having a good burn-through property, that is, a property to prevent the penetration of flame during fire, that is important for interior materials.

With the reinforcing fabric according to the present invention, the uniformity of opening, width-enlarging and flattening of the yarns is very high and the surface smoothness of the fabric is excellent. Therefore, uneven distribution of the carbon fibers when preparing a carbon fiber-reinforced plastic (CFRP), and in turn, generation of voids and portions containing too much resin can be substantially prevented. Further, the degree of bending of the yarns at intersections is small so that the problems due to the concentration of the stress can be avoided. Thus, by using the reinforcing fabric according to the present invention, CFRP having excellent drapability, physical properties and reliability can be obtained.

DETAILED DESCRIPTION OF THE PREFERRED EMBODIMENTS

Figure 1:
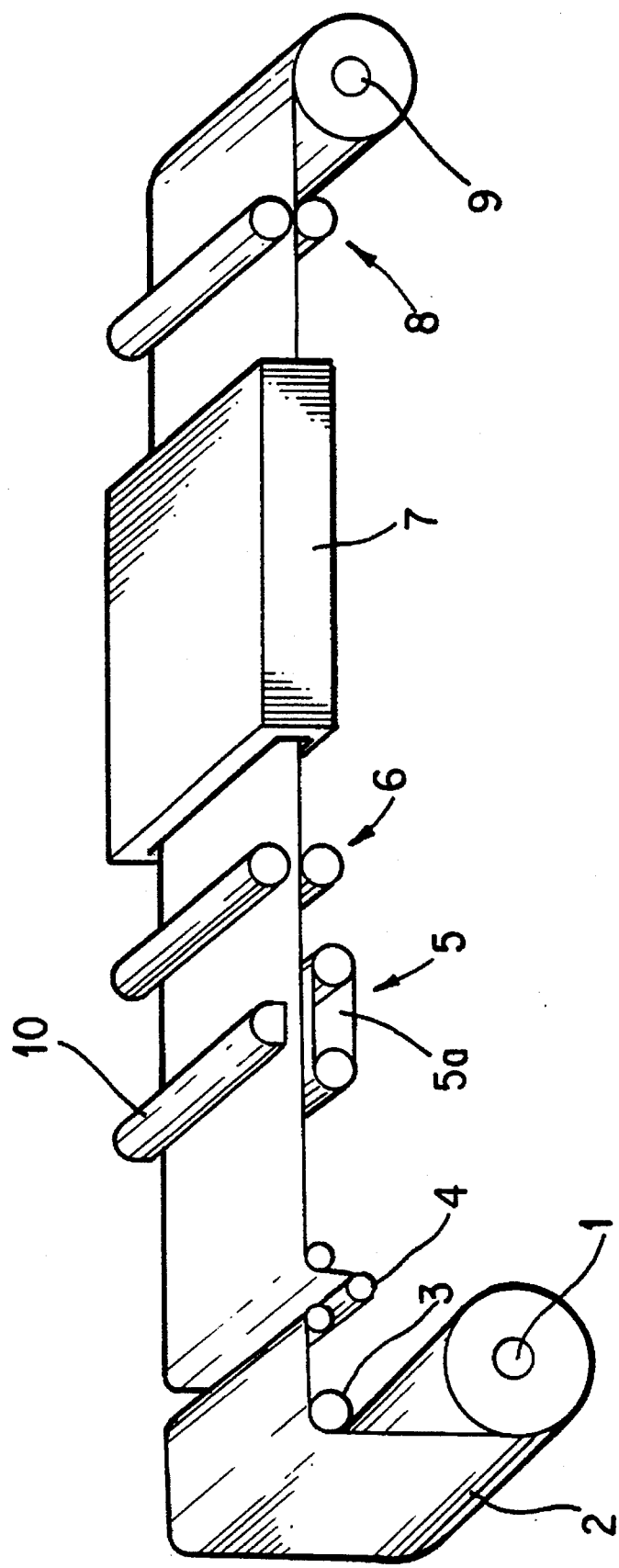
FIG. 1 is a schematic view for explaining the production process of the reinforcing fabric according to the present invention.

A component constituting the epoxy resin composition used in the present invention is an epoxy resin. Epoxy resin means a resin having not less than two epoxy groups on average per one molecule.

Preferred examples of the epoxy resins which are derived from amines include tetraglycidyl diaminodiphenylmethane, triglycidyl-p-aminophenol, triglycidyl-m-aminophenol and triglycidyl aminocresol. Among these, tetraglycidyl diaminodiphenylmethane is especially preferred as a resin for composite material for a structural material of airplanes because it has excellent thermal resistance.

Preferred examples of the epoxy resins derived from phenols include bisphenol A type epoxy resins, bisphenol F type epoxy resins, bisphenol S type epoxy resins, phenol novolak type epoxy resins, cresol novolak type epoxy resins and resorcinol type epoxy resins. Since liquid bisphenol A type epoxy resins and bisphenol F type epoxy resins have low viscosities, they are suited for blending other epoxy resins and additives.

Preferred examples of the epoxy resins derived from compounds having carbon-carbon double bonds include alicyclic epoxy resins. Brominated epoxy resins obtained by brominating these alicyclic epoxy resins are also preferred since the water absorption of the resin is decreased and environment resistance is promoted.

The epoxy resin may be a mixture of two or more epoxy resins and may contain a mono-epoxy compound. The combination of a glycidylamine type epoxy resin and a glycidyl ether type epoxy resin is preferred because it simultaneously satisfies good thermal resistance, water resistance and processability.

In view of the balance of heat resistance, water resistance and processability, the combination of the following epoxy resins in the amounts shown is especially preferred.

| | |
|---|---|
| Bisphenol A type epoxy resin | 10–60 wt % |
| Brominated bisphenol A type epoxy resin | 0–30 wt % |
| Tetraglycidyldiaminodiphenyl methane | 10–40 wt % |
| Bisphenol F type epoxy resin | 5–40 wt % |

Another component constituting the epoxy resin composition used in the present invention is a curing agent. Any compound having active groups which can react with epoxy group may be employed as the curing agent. Compounds having amino groups, acid anhydride groups, azide groups and hydroxy groups may preferably be employed.

For example, dicyandiamide, various isomers of diaminodiphenyl sulfone, aminobenzoates, various acid anhydrides, phenol novolak resins and cresol novolak resins may be employed. Dicyandiamide is preferred because it gives long shelf-life of prepreg. If an aromatic diamine is used as a curing agent, cured epoxy resin having good thermal resistance can be obtained. In particular, various isomers of diaminodiphenyl sulfone are best preferred in the present invention since they give cured resins with good thermal resistance. Diaminodiphenyl sulfone may preferably be used in an amount such that the amount of its active hydrogen is 0.7–1.2 equivalent with respect to the amount of the epoxy groups of the epoxy resin. As the aminobenzoates, trimethyleneglycol-di-p-aminobenzoate and neopentylglycol-di-p-aminobenzoate may preferably be used. Although the resins obtained by using those curing agents have lower thermal resistances than those obtained by using diaminodiphenylsulfone, since they excel in tensile strength and toughness, they may be selected depending on the intended use. If an acid anhydride represented by phthalic anhydride is used as a curing agent, cured resin with good thermal resistance is obtained, and an epoxy resin composition having low viscosity and so having excellent processability can be obtained. A phenol novolak resin or a cresol novolak resin may also preferably be used as a curing agent since ether bonds having good hydrolysis resistance are introduced into the molecular chains, so that the water resistance of the cured resin is promoted.

Further, various curing catalysts may also be employed together with the above-mentioned curing agents. A representative example of the curing catalysts is monoethylamine complex of trifluoroboron. Cyanate resins (triazine resins) may also be employed together with the epoxy resin. In this case, a curing reaction takes place between the cyanate and the epoxy groups, so that a cured resin with low water absorption can be obtained.

The epoxy resin composition used in the present invention further comprises a solid rubber. Solid rubber herein means a rubber which does not have flowability at room temperature. The material of the rubber may be any elastomer.

By adding the solid rubber to the epoxy resin, a resin having high viscosity and high thixotropic property is obtained. During the fabrication, the matrix resin is in a quiescent state to which shearing force is not applied. The high thixotropic property means that the viscosity of the matrix resin is high in such a quiescent state. By virtue of this property of the resin, the formation of pores during the fabrication can be reduced. The rubber especially suited for giving high thixotropic property to the epoxy resin is solid acrylonitrile-butadiene rubber (acrylonitrile-butadiene rubber is hereinafter also referred to as "NBR") having a functional group and a weakly cross-linked structure. The term "weakly cross-linked" means that the rubber is cross-linked to such a degree that the rubber is swollen by a solvent but not dissolved in the solvent.

It is preferred that the solid rubber be three-dimensionally swollen and microdispersed in the epoxy resin so that it partially forms network, and that the solid rubber be not uniformly dissolved. Especially, the above-mentioned rubber having the weakly cross-linked structure is preferred since it always "phase-separated" from the non-cured state to the cured state, and is not uniformly dissolved at any time point. Although the degree of microdispersion of the solid rubber varies depending on the method of mixing and on the composition of the epoxy resin, the width of the rubber phase may preferably be 0.1–10 µm. If the dispersed phase is too small, the viscosity of the resin is unnecessarily decreased, and if the dispersed phase is too large, it hinders the impregnation to the reinforcing woven fabric so that it may be difficult to obtain a prepreg having uniform composition. In view of this, the width of the rubber phase may more preferably be 0.5–5 µm.

It should be noted that an epoxy resin composition having high thixotropic property may also be obtained by using a solid rubber which does not have a cross-linked structure, if an appropriate amount is used. This is also a preferred mode of the present invention.

Further, the solid rubber which does not have a cross-linked structure has relatively low viscosity, so that if a woven fabric of carbon fibers which satisfy the below-described specific equation and which have the below-described specific cover factor $K_c$ is used as a reinforcing fabric, the object of the present invention may easily be attained. This is also a preferred mode of the present invention.

By the addition of the solid rubber, adhesiveness and flexibility of the resin composition are also promoted, so that the tackiness and drapability of the prepreg, which are important characteristics for prepregs, are promoted.

The solid rubber used in the present invention may preferably have a functional group which reacts with the epoxy resin or the curing agent. By this, the solvent resistance and mechanical properties of the cured resin are promoted. Especially preferred functional group is carboxylic group.

It is also preferred to add polyether sulfones to the epoxy resin composition, since the viscosity of the resin composition as well as the tackiness and drapability of the prepreg may easily be controlled. In view of the compatibility with the epoxy resin, polyether sulfones having hydroxyl group at the terminals are preferred.

The content of the solid rubber in 100 parts by weight of the matrix resin composition may preferably be 3–12 parts by weight, more preferably 5–10 parts by weight, in view of preventing the too much decrease in the thermal resistance of the composite, and preventing the generation of pores due to the low viscosity of the resin. On the other hand, the content of the polyether sulfone in 100 parts by weight of the matrix resin composition may preferably be not more than 5 parts by weight, more preferably 1–4 parts by weight, in view of preventing prominent decrease in the tackiness and drapability of the prepreg.

In cases where the resin composition contains a solid rubber having a weakly cross-linked structure, the resin composition may preferably have a complex coefficient of viscosity $\eta_{0.02}$ measured at 80° C. under a vibration frequency of 0.02 Hz of not less than 5000 poise, more preferably not less than 20,000 poise, in view of keeping high viscosity in the quiescent state so as to reduce the porosity during the fabrication of the prepreg.

The complex coefficient of viscosity may be determined as follows using MR-3 Soliquid Meter commercially available from Rheology Co., Ltd.

That is, a plate-plate type (parallel plate type) system employing plates having a diameter of 1.798 cm and a gap between the plates of 0.5 mm is used. The measuring atmosphere is kept at 80° C. A sample is filled between the plates, and one of the plates is vibrated with a prescribed frequency to a amplitude of 1°. From the torque and phase difference generated by the vibration, the complex coefficient of viscosity is determined.

By measuring the complex coefficient of viscosity under the frequency from 0.02–2 Hz, the frequency dependence of the complex coefficient of viscosity can be determined.

In cases where the resin composition contains the solid rubber having a weakly cross-linked structure, it is preferred that the complex coefficient of viscosity $\eta_2$ of the resin composition measured at a frequency of 2 Hz and a complex coefficient of viscosity $\eta_{0.02}$ measured at 0.02 Hz satisfy the equation of $$\log \eta_{0.02} - \log \eta_2 \geq 0.5$$

in view of lowering the viscosity in the state that shearing force is applied, thereby assuring the easy coating of the resin film which tends to be difficult when the resin has a high viscosity.

In cases where the resin composition contains the solid rubber which does not have a cross-linked structure, in view of promoting impregnation property of the prepreg while keeping a good film coating property and while reducing the porosity, the resin composition may preferably have a complex coefficient of viscosity $\eta_{0.5}$ determined at 80° C. under a vibration frequency of 0.5 Hz during heating from 50° C. at a rate of 1.5° C./min (hereinafter referred to as "complex coefficient of viscosity $\eta_{0.5}$ at 80° C." for short) of 100–1500 poise, and have a minimum complex coefficient of viscosity $\eta_{min}$ determined at 80° C. under a vibration frequency of 0.5 Hz during heating from 50° C. at a rate of 1.5° C./min of 50–300 poise.

In cases where the resin composition contains a solid rubber not having a cross-linked structure, it is preferred to employ a woven fabric made of carbon fibers which satisfy the equation of $W=k\cdot(D/\rho)^{5/9}$ and having a cover factor $K_c$ of 90.0–99.8% as described below in detail, since especially advantageous effects are obtained.

The reinforcing fibers constituting the woven fabric may be any fiber which is used as a advanced composite material having good thermal resistance and tensile strength. Examples of the fibers include carbon fibers, graphite fibers, aramide fibers, silicon carbide fibers, alumina fibers, boron fibers, tungsten-carbide fibers and glass fibers. Among these, carbon fibers and graphite fibers are especially preferred since they have high specific strength and high specific elastic modulus, and they largely contribute to the light weight of the prepreg.

Although any type of carbon fibers and graphite fibers may be employed depending on the intended use, high strength, high elongation carbon fibers having a tensile strength of not less than 350 kgf/mm$^2$ and a tensile elongation of not less than 1.5% are best preferred.

The reinforcing woven fabric made of the reinforcing fibers may be a conventional two-dimensional woven fabric. Biaxially woven fabrics having a fabric tissue in which warps and woofs cross at right angles, such as plane weaving, twill or satin are preferred.

In cases where the resin composition contains a solid rubber which does not have a cross-linked structure, in view of reducing the porosity, it is preferred to use a reinforcing woven fabric which has warps and woofs which are multifilament yarns made of carbon fibers, the widths W (mm) and finenesses D (d:denier) of the warps and woofs satisfying the equation of:

$$W=k\cdot(D/\rho)^{5/9}$$

(wherein k represents $3.5\times10^{-2}$–$10.0\times10^{-2}$ (mm·d$^{-5/9}$) and $\rho$ represents specific gravity of the carbon fibers), and which has a cover factor $K_c$ of 90.0–99.8%.

The cover factor $K_c$ is the cover factor of the woven fabric, which relates to the size of the mesh of the woven fabric. The cover factor $K_c$ may be determined as follows. That is, a region having an area $S_1$ is defined on a woven fabric. $C_f$ which is defined by the equation of:

$$C_f=[(S_1-S_2)/S_1]\times 100$$

is determined for optional 10 regions. The arithmetic average is defined as cover factor $K_c$. The larger the cover factor $K_c$, the more progressed the opening of the yarns, the enlargement of the width of the yarns and the flattening of the yarns, and the smaller the mesh of the woven fabric.

In order to avoid the formation of a region in the skin of the composite, in which carbon fibers do not exist, in which resin is too much, or in which voids are contained, it seems that the cover factor $K_c$ is preferably 100%, that is, the meshes are completely crushed. However, in such a woven fabric, the yarns are too much restrained each other and the freedom in the movement of the yarns are too small, so that the prepreg has poor drapability and wrinkles are likely to be formed. Thus, it is preferred to provide a very small clearance among the yarns so as to assure freedom in deforming. In view of the balance between the degree of opening, width-enlargement and flattening of the yarns and the drapability, the upper limit of the cover factor is preferably 99.8%. On the other hand, if the cover factor is less than 90%, although the drapability is good, the meshes are too large.

The concrete method for measuring the cover factor $K_c$ of the woven fabric may be as follows:

First, using a stereoscopic microscope, e.g., stereomicroscope SMZ-10-1 commercially available from Nikon, a photograph of the surface of the fabric is taken while illuminating the back side of the fabric. Thus, in the photograph, the transmitted light pattern is shown, wherein the yarns are black and meshes are white. The intensity of the illumination light is so controlled that halation does not occur. In the examples hereinbelow described, the light from the double arm fiber commercially available from Nikon is used after reflected by an acryl plate. The magnification of the photograph is set to not less than 10 magnification so that 2–20 warps and woofs are contained, respectively. The obtained photograph is then photographed using a CDC (charge coupled device) camera and the image is then converted to digital data indicating white and black. The data are stored in a memory and then processed with an image processing apparatus to calculate the $C_f$ according to the above-mentioned equation from the total area $S_1$ and the total area $S_2$ of the white portions. The above-mentioned procedure is repeated 10 times for different portions of the same fabric, and the arithmetic average is defined as cover factor $K_c$ of the fabric. In the Examples later described, Personal Image Analyzing System LA-525 commercially available from Pierce Co., Ltd. was used as the CCD camera and the image processing apparatus. The range of the image-analyzed area was from the left most of portion of the left most warp to the right most portion of the right most woof, and from the upper most portion of the upper most woof to the lower most portion of the lower most woof. Within this range, 2–20 warps and woofs are included, respectively. In the digital data, intermediate portions (between white and black) is included between the yarns (black portion) and meshes (white portion). To clearly allocate the intermediate portions to the yarn portions or mesh portions, black tapes having a width of 6 mm were stuck on a transparent paper such that the tapes form a lattice. The lattice was normalized to have a cover factor of 75%. That is, the iris diaphragm of the CCD camera was set to 2.8, and the memory value of not more than 128 in the image analyzing system LA-525 was normalized to be yarn portion (In this system, the light and shade of the white and black is recorded as memory values of 0–255 grades.)

Such a woven fabric can be produced by, for example, as follows:

First, a woven fabric having warps and woofs made of multifilament yarns made of carbon fibers is produced by an ordinary weaving operation.

In view of the ease of weaving operation and of the uniformity of the dispersion of single fibers in a yarn after the below-described operation for opening, width-enlarging and flattening operation, the number of single fibers constituting a yarn may preferably be 3,000–30,000, and the fineness of the yarn may preferably be 1,200–40,000 denier. Although the number of fibers per yarn may be less than 3,000, in that case, the "k" in the above-described equation is $4.5 \times 10^{-2} – 10.0 \times 10^{-2}$ (mm·d$^{-5/6}$).

The diameter of a single fiber may preferably be 5–10 μm. To make the opening, width-enlarging and flattening operation of the fibers easy and uniform, the number of twisting of the yarn may preferably be not more than 5 turns/m. Although from the view point of the opening, width-enlarging and flattening operation, yarns which are not twisted at all are preferred, weaving non-twisted yarns may be somewhat difficult. Thus, the yarns are preferably twisted to not less than 0 turns/m and not more than 5 turns/m.

Such a multifilament yarn may preferably be prepared by applying a sizing agent in an amount of 0.2–1.8% based on the weight of the yarns to twisted mutifilament yarns made of carbon fibers, drying the resultant, winding the dried yarns about a bobbin, and untwisting the yarns to not more than 5 turns/m. More particularly, twisted multifilament yarns made of precursor fibers are sintered to carbonize the fibers. Then a sizing agent is applied to the yarns and dried, followed by winding the yarns about a bobbin. Then the yarns are untwisted while rotating the bobbin. By this operation, due to the air resistance exerted to the yarns, a balloon is formed. If the amount of the applied sizing agent is 0.2–1.8% by weight, the sizing agent is peeled off by the friction with the air. As a result, the fibers become free from restraints by each other and the yarns are opened. The fabric made of such multifilament yarns can be subjected to a sufficient and uniform opening, width-enlarging and flattening operation even if the punching force of the water jet is small. That is, the opening, width-enlarging and flattening operation can be carried out under mild conditions. If an epoxy-based sizing agent is used, desizing is not necessary, so that the fabric after the opening, width-enlarging and flattening operation by water jet can be subjected to the step of forming prepreg or CFRP as it is. Conventional epoxy-based sizing agents may be used. Typical epoxy-based sizing agent may contain, in addition to an epoxy resin, polyethylene glycol, water-soluble polyurethane resin, polyvinyl formal resin, nonionic surfactant, anionic surfactant and/or a cationic surfactant. In cases where the epoxy-based sizing agent contains a water-soluble component or a surface active agent, the fabric may preferably be wetted by water or warm water since the sizing agent is swollen with water, so that the opening and width-enlarging of the fibers by the water jet may easily be attained.

In cases where the multifilament yarns made of the carbon fibers are used for preparing the woven fabric, to attain easy and uniform operation for opening, width-enlarging and flattening, it is preferred to make the clearances among the warps and woofs (i.e., the meshes) larger than those of the ordinary fabric. The degree thereof depends on the width of the yarns, but the width of the meshes is preferably at least ⅓ of the width of the warps. When the width of the warps is 1.5 mm, the best width of the meshes is about 0.5 mm.

The fabric tissue may preferably be plain weaving. It is best preferred that the warps and woofs have the same number of carbon fibers per yarn and have the same fineness, and that the weaving densities of the warps and woofs be the same.

The weight of the woven fabric per a unit area may optionally be selected. In view of ease and uniformity of the opening, width-enlarging and flattening operation, and in view of the shape-retaining ability and of the cover factor $K_c$, the weight of the woven fabric may preferably be 120–250 g/m², more preferably 140–195 g/m². This range of weight is especially preferred when the number of single fibers per yarn is 3,000. It should be noted that the weight per a unit area is not changed before and after the opening, width-enlarging and flattening operation of the yarns.

The woven fabric is then subjected to the operation for opening, width-enlarging and flattening the yarns constituting the warps and woofs. This may be carried out by continuously feeding the woven fabric in the direction of warps and treating the woven fabric with water jets from a plurality of nozzles arranged in the direction of the woofs.

For the ease of the operation for opening, width-enlarging and flattening the yarns constituting the warps and woofs, the diameter of the holes in the nozzles may preferably be 0.05–0.5 mm, the nozzle pitch may preferably be not more than ⅓ of the pitch of the woofs of the fabric, and the beating force per one water jet may preferably be 0.1–3 gf.

The above-described process will now be described referring to the drawings. As shown in FIG. 1, a fabric 2 wound about a winding core 1 is introduced on a conveyor belt 5 having a metal mesh 5a as a conveyor belt through a rolling guide 3 and a dancing roller 4 which controls the tension of the fabric 2. The fabric 2 is further introduced to a winding core 9 about which it is wound through a pair of dehydration rollers 6, a drier 7 and nip rollers 8. While continously moving the fabric as described above, water jets are applied to the fabric 2 on the conveyor 5 from a nozzle apparatus 10 located at a position 5–30 cm above the conveyor belt 5. The water jets are applied to the fabric 2 at an angle of 90°±20° with respect to the surface of the fabric 2. By the punching force of the water jets, opening, width-enlarging and flattening of the yarns are carried out. The fabric after the operation is subjected to the dehydration rollers 6 by which water is squeezed out. The fabric 2 is then dried by the drier 7 and is wound about a winding core 9 through nip rollers 8. The running speed of the fabric 2, that is, the operation speed may preferably be, although it depends on the punching force of the water jet, 0.5–20 m/min. When the punching force is strong, the fabric can be treated at a high speed, and when the punching force is weak, the fabric can be treated at a low speed. The operation speed is more preferably 0.5–15 m/min. Needless to say, the direction of the warps is the longitudinal direction of the fabric. Therefore, the direction in which the fabric is running is the direction of the warps.

Figure 2:
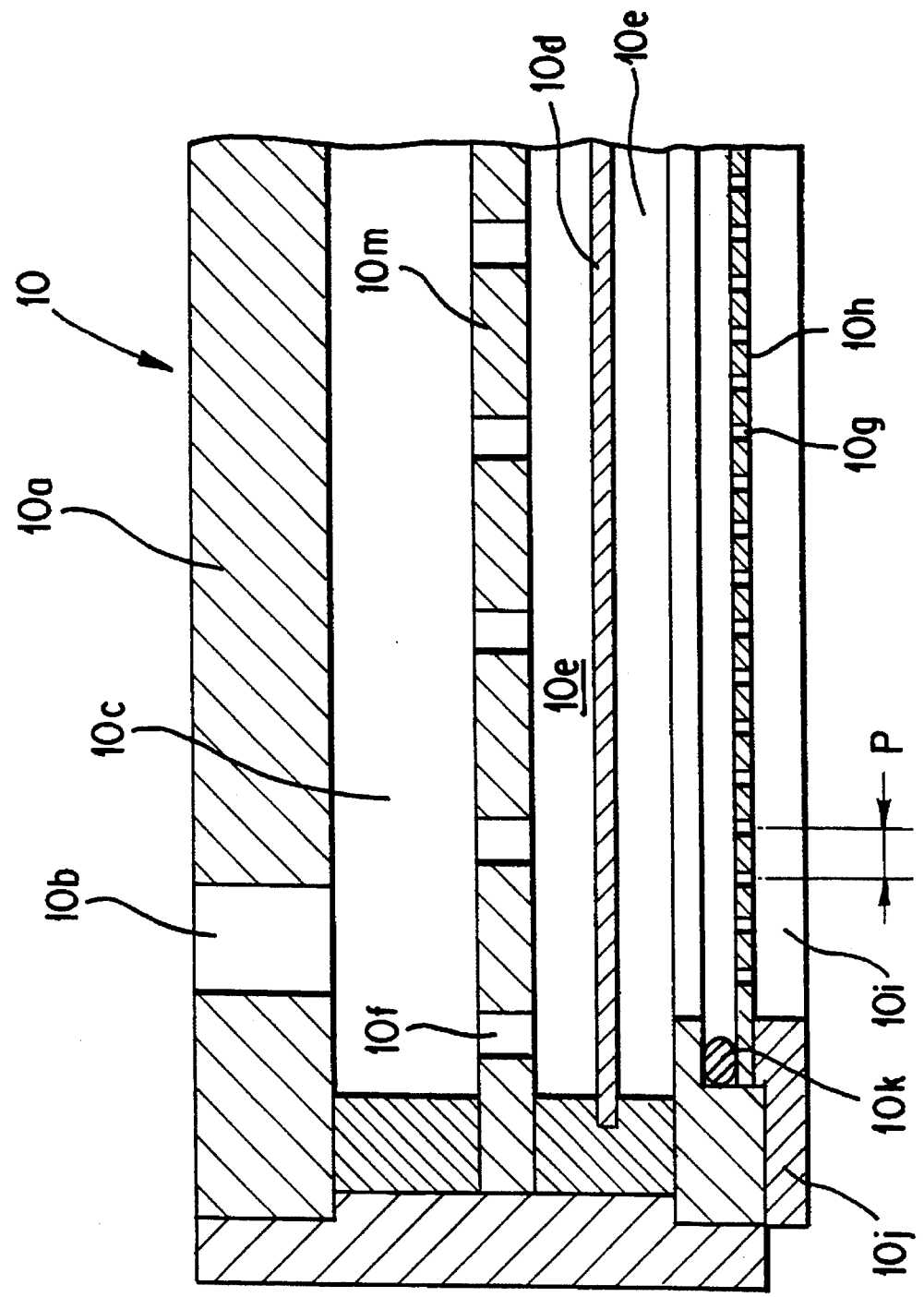
FIG. 2 is a schematic cross-sectional view of the left half of a preferred embodiment of the nozzle apparatus which can be used in the process shown in FIG. 1.

A schematic cross-sectional view of the nozzle apparatus 10 is shown in FIG. 2. As shown in FIG. 2, the nozzle apparatus 10 comprises a main body 10a in which a pressurized water inlet 10b is formed; an upper path 10c communicating to the pressurized water inlet 10b; a porous plate 10d by which lower path 10e is divided; an adjusting plate 10m having communication holes 10f which communicate the upper path 10c to the lower path 10e; and a nozzle plate 10h in which a number of nozzle holes 10g are aligned in a row at a pitch P. The nozzle plate 10h is attached to the main body 10a by a pressure-resistant plate 10j having an opening 10i. Reference number 10k denotes an O-ring for sealing. Although only a half of the nozzle apparatus is shown in FIG. 2, another half has the symmetrical structure. Although the nozzle holes are aligned in a row in the embodiment shown in FIG. 2, they may be arranged zigzag.

In operation, the nozzle apparatus 10 is arranged such that the row of the nozzle holes 10g is coincident with the direction of the woofs of the fabric 2 (i.e., the widthwise direction). Pressurized water is introduced from the pressurized water inlet 10b to the upper path 10c and then the water is introduced into the lower path after being adjusted by passing through the communication holes 10f. The water flow is further adjusted by the porous plate 10d so as to uniform the pressure and the water is jetted from the nozzle holes 10g of the nozzle plate 10h to form water jets. The nozzle apparatus 10 may preferably be shaken in the direction of the woofs of the fabric. The amplitude of the shaking may preferably be 1–5 times the pitch of the warps, and the period of shaking may preferably be 0.03–1 second.

The diameter of the nozzle holes of the nozzle apparatus is 0.05–0.5 mm. If the diameter is smaller than 0.05 mm, the quantity of water is not sufficient, so that sufficient energy for opening, width-enlarging and flattening the yarns cannot be obtained even if the punching force at the surface of the fabric is made strong. Further, the nozzle holes are likely clogged so that it is difficult to carry out stable operation. On the other hand, if the diameter is more than 0.5 mm, the quantity of water is too large and adjacent water jets interfere each other, so that the fibers constituting the yarns may be irregularly bent or the uniformity of the opening, width-enlarging and flattening of the yarns may be largely decreased.

The pitch of the nozzle holes is preferably not more than ⅓ of the pitch of the warps of the fabric. If the pitch is as large as more than ⅓ of the pitch of the warps, the unevenness of the energy distribution of the water jets on the surface of the fabric is too large, and in an extreme case, there is a warp to which water jet is not at all applied. As a result, the uniformity of the opening, width-enlarging and flattening of the yarns is largely decreased.

The punching force per one water jet at the surface of the fabric is adjusted to 0.1–3 gf. If the punching force is less than 0.1 gf, the punching force is too small so that sufficient energy required for the opening, width-enlarging and flattening operation cannot be obtained. On the other hand, if it is more than 3 gf, the punching force is too large, so that breakage of the fibers frequently occurs and the broken fibers become nappy. As a result, the uniformity of the opening, width-enlarging and flattening of the yarns is largely decreased. The punching force per water jet is preferably 0.1–1.5 gf, more preferably 0.3–1 gf. The punching force is determined as follows:

That is, an edge of a stainless steel plate with a thickness of 0.96 mm and a width of 40 mm, which has a strain gauge, is fixed. The portion of the steel plate, which is 150 mm away from the fixed end and 10 mm away from another end, is positioned at the surface of the fabric, and water jets are applied to this portion. As a result, the stainless steel plate is deformed by the punching force by the water jets. The amount of the deformation is measured by the strain gauge to determine the force exerted to the stainless steel plate. The determined force is divided by the number of water jets applied to the steel plate. The obtained value is the punching force per one water jet.

By this operation, the warps and woofs may easily attain the widths and finenesses which satisfy the above-described equation of:

$$W = k \cdot (D/\rho)^{5/9}.$$

In the woven fabrics which satisfy this equation, the yarns are very uniformly opened, width-enlarged and flattened, and the bending at the intersections of warps and woofs is very small so that they excel in surface smoothness. It should be noted that "k" in the above-described equation relates to the degree and uniformity of the opening, width-enlarging and flattening of the yarns, and if the "k" is lower than the above-mentioned lower limit, the width-enlarging and flattening are not sufficiently progressed, so that the bending at the intersections of the yarns is large and the irregularity in the surface is also large. On the other hand, if the "k" is more than the above-described upper limit, the degree of opening of the yarns is uneven.

Among the woven fabrics described above, those in which the warps and woofs are made of multifilament yarns having the same number of single fibers per yarn and have the same fineness, of which fabric tissue is plain weaving, whose warps and woofs satisfy the above-described equation of $W = k \cdot (D/\rho)^{5/9}$, whose weaving densities in the directions of the warps and woofs are the same, whose weight is within the range of 120–250 g/m², and which has a cover factor $K_c$ within the range of 90–99.8% are especially suited for the present invention. If the number of single fibers per one multifilament yarn is 3000, the fabric is even more preferred.

In general, woven fabrics, except for those having specific fabric tissues, are highly anisotropic since the warps and woofs extend in the directions which are at right angles. However, if the numbers of fibers per a multifilament yarn in the warps and woofs, as well as the finenesses of the warps and woofs are identical, the characteristics in the directions at right angles are the same. Therefore, by laying-up the fabrics shifting a prescribed angle, e.g., 45°, pseudoisotropic characteristics can easily be attained. Further, from the view point of manufacturing process, if the number of single fibers per yarn and the finenesses of the warps and woofs are identical, and if the weaving densities are identical in the warp and woof directions, the size of a mesh is identical in the warp and woof directions. Therefore, by opening the multifilament yarns to the same degree in both the directions, the width-enlarging and flattening of the yarns can easily be attained.

Further, if the fabric tissue is plain weaving, a thin and stable woven fabric in which the deformation of the meshes is small, may be obtained.

Further, if the number of single fibers per yarn and the finenesses of the warps and woofs are identical, if the weaving densities are identical in the warp and woof directions, and if the weight is 120–250 g/m², the cover factor $K_c$ is not too small, the bending of the multifilament yarns at the intersections is smaller, so that the breakage by the concentration of stress can surely be avoided, and the irregularity in the surface is small, thus it is preferred. From the view point of manufacturing process, in the fabric having such a weight per a unit area, the restraint by the yarns each other is small in spite of the fact that the fabric tissue is plain weaving, and the size of the mesh is small, so that the opening, width-enlarging and flattening of the yarns can be easily attained with water jets. The weight of the fabric may more preferably be 140–195 g/m².

As the resin composition to be impregnated to such a woven fabric that satisfies the above-described equation of $W = k \cdot (D/\rho)^{5/9}$ and has a cover factor $K_c$ of 90–99.8%, since resin compositions having relatively low viscosities are preferred to reduce the porosity, a resin composition containing an epoxy resin, a curing agent and a solid NBR which has a functional group and does not have a cross-linked structure is preferred.

It is more preferred that the resin composition just mentioned above have a complex coefficient of viscosity $\eta_{0.5}$ determined at 80° C. under a vibration frequency of 0.5 Hz during heating from 50° C. at a rate of 1.5° C./min of 100–1500 poise, and has a minimum complex coefficient of viscosity $\eta_{min}$ determined at 80° C. under a vibration frequency of 0.5 Hz during heating from 50° C. at a rate of 1.5° C./min of 50–300 poise.

For the purpose of controlling the viscosity of the resin, or improving physical properties of the composite, such as compression strength and toughness, the cloth prepreg of the present invention may contain particles of calcium carbonate, talc, mica, silica, carbon black, silicon carbide, alumina hydrate or the like. Although the content of such particles is not restricted as long as they adversely affect the advantageous effects of the present invention, the content of the particles may usually be 0.1 to 3.0% based on the weight of the epoxy resin composition.

The cover factor $K_p$ of the cloth prepreg of the present invention is 97–99.9%. It should be noted that the cover factor $K_p$ is not the above-described cover factor $K_c$ of the woven fabric, but is the cover factor of the cloth prepreg after the resin composition is impregnated into the woven fabric.

If the cover factor $K_p$ is less than 97%, the degree of crushing of the meshes which are clearances formed among the warps and woofs of the reinforcing woven fabric is insufficient, so that pores are likely to be formed in the honeycomb fabricated plate, and the burn-through property, that is, a property to prevent the penetration of flame during fire, that is important for interior materials, is not promoted. On the other hand, if the cover factor $K_p$ is more than 99.9%, the drapability which is an important characteristic of a prepreg, is largely decreased.

In contrast, if the cover factor $K_p$ is within the range of 97–99.9%, the porosity of the honeycomb fabricated panel is largely decreased while keeping the good drapability intrinsic to the cloth prepreg.

Further, in the cured plate obtained by curing the above-described cloth prepreg, the reinforcing fibers are uniformly distributed and the cover factor is large, so that cured plate excels in the burn-through property, that is, a property to prevent the penetration of flame during fire, that is important for interior materials.

The cover factor $K_p$ is determined by the same method as the above-described method for determining the cover factor $K_c$, except that cloth prepreg is subjected to the measurement in place of the woven fabric.

The prepreg of the present invention may be prepared, in principle, by a conventional method for producing prepregs employing an epoxy resin as a matrix resin. Although the prepreg may be prepared by impregnating the reinforcing woven fabric with the resin composition after the resin composition is dissolved in an appropriate solvent (i.e., wet process), if the above-described epoxy resin composition is used, a prepreg having no porosity can be prepared by the non-solvent method (hot-melt method) by which pores are otherwise likely to be formed. Since the above-described epoxy resin has high viscosity and yet has thixotropic property, the resin coating by the hot-melt method is unexpectedly easy.

The solid rubber having the weakly cross-linked structure forms micro-phases dispersed in the epoxy resin so as to give high viscosity and high thixotropic property to the resin. If the prepreg employing this resin as a matrix resin is used as a surface material of the honeycomb fabricated panel, the formation of pores which likely to be formed in the interlayer zones is drastically reduced. Since the epoxy resin composition containing the solid rubber has high viscosity and yet has thixotropic property, the resin coating by the hot-melt method is unexpectedly easy.

Further, the addition of the solid rubber having the weakly cross-linked structure promotes the flexibility and adhesiveness of the resin, so that appropriate tackiness and drapability are given, while not deteriorating the high elastic modulus, high thermal resistance and high solvent resistance which are intrinsic to a thermosetting resin.

When a resin film is prepared by the hot-melt method, if the viscosity of the resin is high, film-formation is usually difficult. However, since the solid rubber having a weakly cross-linked structure gives high thixotropy even if the viscosity is high, the resin coating by the hot-melt method is unexpectedly easy.

In cases where the solid rubber having a weakly cross-linked structure is used, when a prepreg is produced by the hot-melt method, the impregnation of the resin may preferably be carried out in two steps wherein the impregnation pressure in the first step is higher than in the second step. In this case, the resin composition which is impregnated in the first impregnation step may preferably have a complex coefficient of viscosity $\eta_{0.02}$ measured at 80° C. under a vibration frequency of 0.02 Hz of not less than 5000 poise and less than 40,000 poise, and the resin composition which is impregnated in the second impregnation step may preferably have a complex coefficient of viscosity $\eta_{0.02}$ measured at 80° C. under a vibration frequency of 0.02 Hz of 40,000–400,000 poise. Further, it is preferred to impregnate a resin composition containing an epoxy resin, at least one curing agent selected from the group consisting of aromatic amine curing agents, acid anhydride curing agents, dicyandiamide curing agents and novolak curing agents, and a solid rubber, in the first impregnation step and to impregnate a resin composition further containing polyether sulfone in addition to the components just mentioned above in the second impregnation step.

In the thus obtained prepreg, the resin composition impregnated in the first impregnation step constitutes an inner layer and the resin composition impregnated in the second impregnation step constitutes a surface layer. This structure is preferred since the porosity in the cured plate can be made small.

By dividing the impregnation process into two steps, the resin content of the prepreg after the first step may be made small so that the pressing out of the resin can be prevented even if a high impregnation pressure is applied. As a result, the quality of the finally obtained prepreg can be made high and the porosity of the fabricated plate can be extremely reduced.

In view of effectively preventing the pressing out of the resin even when a high impregnation pressure is applied and providing a prepreg having good impregnation property so as to provide a final prepreg having high quality, the resin content $W_R$ of the intermediate prepreg after the first impregnation step may preferably be 25–30%, more preferably 27–29%. The resin content of the final prepreg may usually be 30 to 50%, although not restricted, irrespective whether the prepreg is prepared by the two-step process or one-step process.

The impregnation linear pressure (maximum contact stress) applied during the first impregnation step may preferably be not less than 1000 kg/cm$^2$, more preferably not less than 1200 kg/cm$^2$.

The impregnation linear pressure (maximum contact stress) $\sigma_H$ (kg/cm$^2$) is calculated from the following Hertz' elastic contact theory when two cylindrical rolls made of the same material are used:

$$\sigma_H(kg/cm^2)=0.418(PE/Lr^*)^{1/2}$$

(wherein P represents the load applied to the rolls, E represents the elastic modulus of the rolls, L means the contact length of the rolls, r* represents radius of curvature represented from radii $r_1$ and $r_2$ of the two rolls which is calculated from the following equation:

$$(1/r_1)+(1/r_2)=1/r^*)$$

By preparing an intermediate prepreg having a good impregnation property in the first impregnation step, even if the second impregnation step is carried out at an impregnation pressure which is low enough to prevent the pressing out of the resin, a final prepreg having good impregnation property can be obtained. The thus obtained prepreg has a high stability of the resin content $W_R$, and its tackiness is also good.

In view of preventing the reduction in strength due to voids and preventing the degradation of the physical properties of the composite due to the repeated freezing of water, the ratio B of the area occupied by the voids in an optional cross-section may preferably be not more than 0.5%.

The impregnation property can be evaluated by curing the prepreg under the conditions in which the matrix resin does not substantially flow during the curing reaction, observing a polished cross-section of the cured prepreg and determining the percentage of the area of the non-impregnated region.

To clearly distinguish non-impregnated region from impregnated region when a cross-section of the prepreg is observed, it is necessary to polish the cross-section. To this end, it is necessary to heat the prepreg to cure. However, if a thermosetting matrix resin is heated, the viscosity is once decreased with the raise of the temperature and flowing of the resin is observed. If the resin flows during the curing process, the resin flows into the regions which are not impregnated in the original prepreg, so that the impregnation property thus determined does not reflect the state of the original prepreg. Therefore, in the curing of the prepreg, the increase in the viscosity due to the reaction of the resin must be more than the decrease in the viscosity due to the raise of the temperature. This may be attained by gradually raising the temperature to cure the resin. For example, in cases where a resin mixture containing a mixture of glycidylamine type epoxy resin and bisphenol A type epoxy resin, and an equivalent amount of diaminodiphenylsulfone as a curing agent is used, the preferred rate of raising temperature is not more than 1° C./hour.

When a polished cross-section of the thus cured prepreg is observed with an optical microscope, the non-impregnated regions in the prepreg is observed as voids in which the matrix resin does not exist. The void content B is calculated by the following equation:

$$B=(b/a)\times 100\ (\%)$$

(wherein "a" represents the area of an optional region in a photomicrograph of a cross-section and "b" represents the area occupied by voids).

The relationship between the void content B and the porosity P in the composite will now be described.

The methods for fabricating the composite using a prepreg include vacuum bag method, autoclave method using a vacuum bag and press method. Among these, to fabricate a composite with high performance, autoclave method using a vacuum bag is preferably employed.

Thus, a composite was prepared by the autoclave method using a vacuum bag, employing a prepreg whose void content B is known, and the optional region in an optional polished cross-section was observed with a microscope. As a result, a positive correlation was observed between the void content B and the porosity P in the composite. That is, if the void content B is small, the porosity P in the composite is small. Further, it was found that if the void content B is not more than 0.5%, by employing a prepreg which is appropriately flow-controlled, a composite having a porosity of substantially 0 can be obtained. Although the upper limit of the void content B of the more preferred range is 0.3%, it is not necessary to lower the void content B below the lower limit of 0.05%. If the void content B is unnecessarily low, in the wet method, a drying step at a high temperature for a long time is necessary to evaporate the solvent more, and in the hot-melt method, a higher temperature is necessary to decrease the viscosity of the resin, so that in both cases, the reaction of the resin is accelerated. As a result, the tackiness and drapability of the prepreg may be deteriorated.

According to a second aspect of the present invention, a prepreg comprising the above-described reinforcing fabric according to the present invention and a thermoplastic matrix resin is provided. Examples of the thermosetting matrix resin include epoxy resins, unsaturated polyester resins, phenol resins, polyimide resins, and bismaleimide resins at B stages. Such a prepreg may be prepared according to a conventional method in which the reinforcing fabric is impregnated with the above-mentioned thermosetting resin. The content of the thermosetting resin in the prepreg may preferably be 30–50% by weight, more preferably 35–45% by weight.

The present invention will now be described by way of examples thereof. It should be noted that the examples are presented for the illustration purpose only and should not be interpreted in any restrictive way.

EXAMPLE 1

An epoxy resin composition having the following composition was prepared in a kneader. The resin composition was heated at 80° C. for a short time and coated on a releasing paper to obtain a resin film. In the following Examples and Comparative Examples, all parts are by weight unless otherwise specified.

<Epoxy Resin>

| | |
|---|---|
| Brominated bisphenol A type Solid Epoxy (EPC152) | 13.4 parts |
| Bisphenol A type Liquid Epoxy (EP 828) | 26.8 parts |
| Tetraglycidyldiaminodiphenyl methane (ELM 434) | 17.0 parts |
| Bisphenol F type Liquid Epoxy (EPC830) | 8.5 parts |
| <Curing Agent> | |
| 4,4'-DDS (4,4'-diaminodiphenylsulfone) | 23.0 parts |
| BF$_3$.MEA (BF$_3$ monoethylamine complex) | 0.3 parts |
| <Solid Rubber> | |
| Carboxyl-terminated solid NBR having weakly cross-linked structure | 8.0 parts |
| <Thermoplastic Resin> | |
| Hydroxyl-terminated polyether sulfone (PES100P) | 3.0 parts |
| Total | 100.0 parts |

This resin film was set in a prepreg machine and impregnated into a plain-woven fabric made of carbon fibers (TORAYCA C07373, commercially available from TORAY INDUSTRIES, INC.) from both sides of the fabric, to obtain a prepreg having a resin content $W_R$ of 40%. This prepreg had an excellent tackiness and drapability, and its cover factor $K_p$ was 99%.

Figure 3:
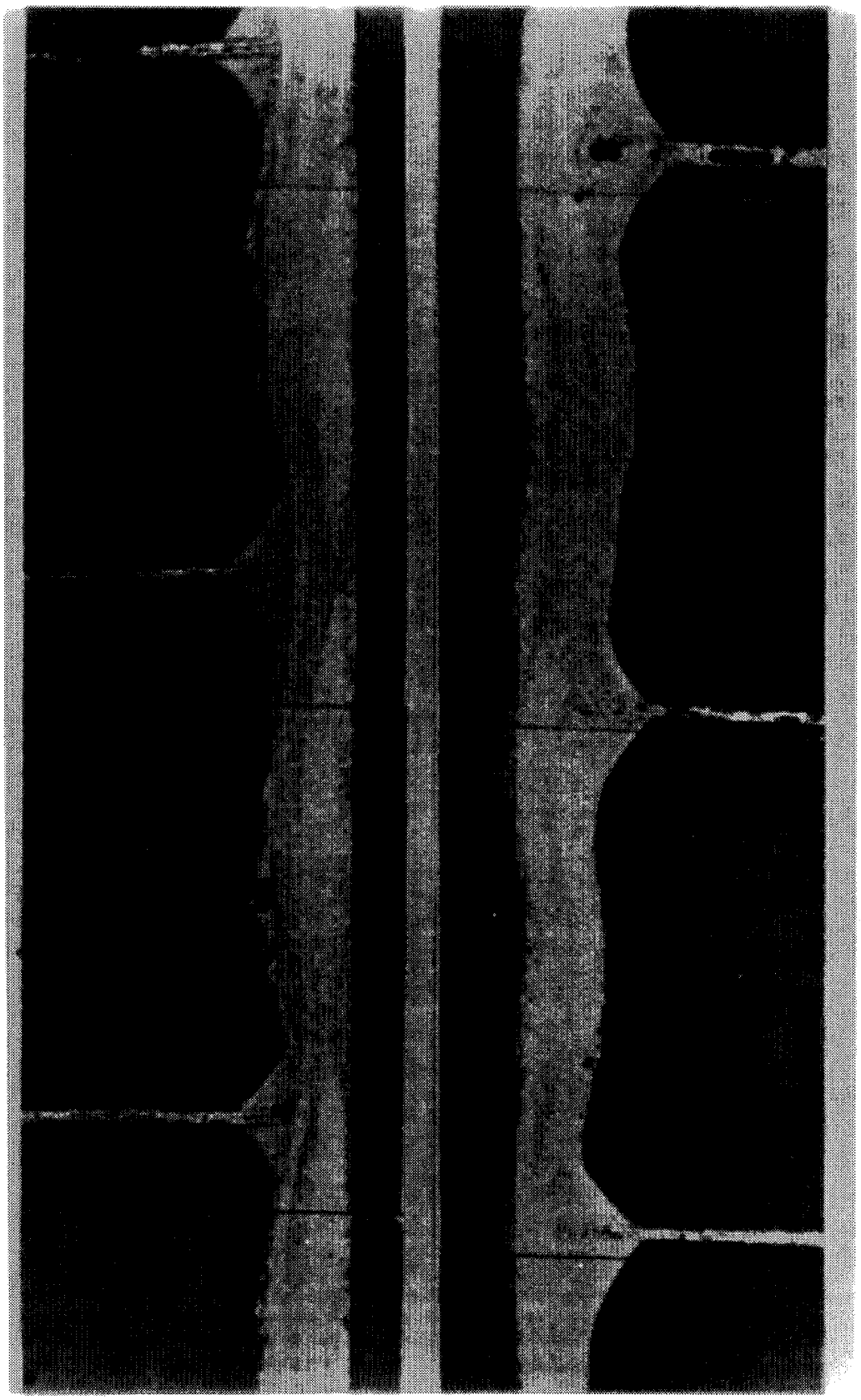
FIG. 3 is a photomicrograph of a cross-section of the honeycomb sandwich panel prepared in Example 1 after polishing.

A honeycomb panel was fabricated laying-up this prepreg and a photomicrograph of a polished cross-section thereof was taken, which is shown in FIG. 3. In the entire cross-section, pores are not substantially observed and the porosity P was 0.05%.

Twenty of the thus prepared prepregs were laid-up in the same direction and the resulting laminate was cured. The toughness $G_{IC}$ of the obtained cured plate was measured by the double cantilever method, which was 9.5 pounds/inch.

To prepregs were laid-up and the laminate was cured. The resulting cured plate was tested for its burn-through characteristics. The cured plate was placed on a tripod and heated with a gas burner under the cured plate. The time required for the flame to penetrate the plate was measured, which was 280 seconds.

COMPARATIVE EXAMPLE 1

An epoxy resin composition having the following composition was prepared in a kneader. The resin composition was heated at 80° C. for a short time and coated on a releasing paper to obtain a resin film.

<Epoxy Resin>

| | |
|---|---|
| Brominated bisphenol A type Solid Epoxy (EPC152) | 13.4 parts |
| Bisphenol A type Liquid Epoxy (YD 128) | 26.8 parts |
| Tetraglycidyldiaminodiphenyl methane (ELM 434) | 17.0 parts |
| Bisphenol F type Liquid Epoxy (EPC830) | 8.5 parts |
| <Curing Agent> | |
| 4,4'-DDS (4,4'-diaminodiphenylsulfone) | 23.0 parts |
| BF$_3$.MEA (BF$_3$ monoethylamine complex) | 0.3 parts |
| <Liquid Rubber> | |
| Epoxy-terminated liquid NBR (TSR-601) | 8.0 parts |
| <Thermoplastic Resin> | |
| Hydroxyl-terminated polyether sulfone (PES100P) | 3.0 parts |
| Total | 100.0 parts |

This resin film was set in a prepreg machine and impregnated into a plain-woven fabric made of carbon fibers (TORAYCA C07373, commercially available from TORAY INDUSTRIES, INC.) from both sides of the fabric, to obtain a prepreg having a resin content $W_R$ of 40%. The cover factor $K_p$ of this prepreg was 92%.

Figure 4:
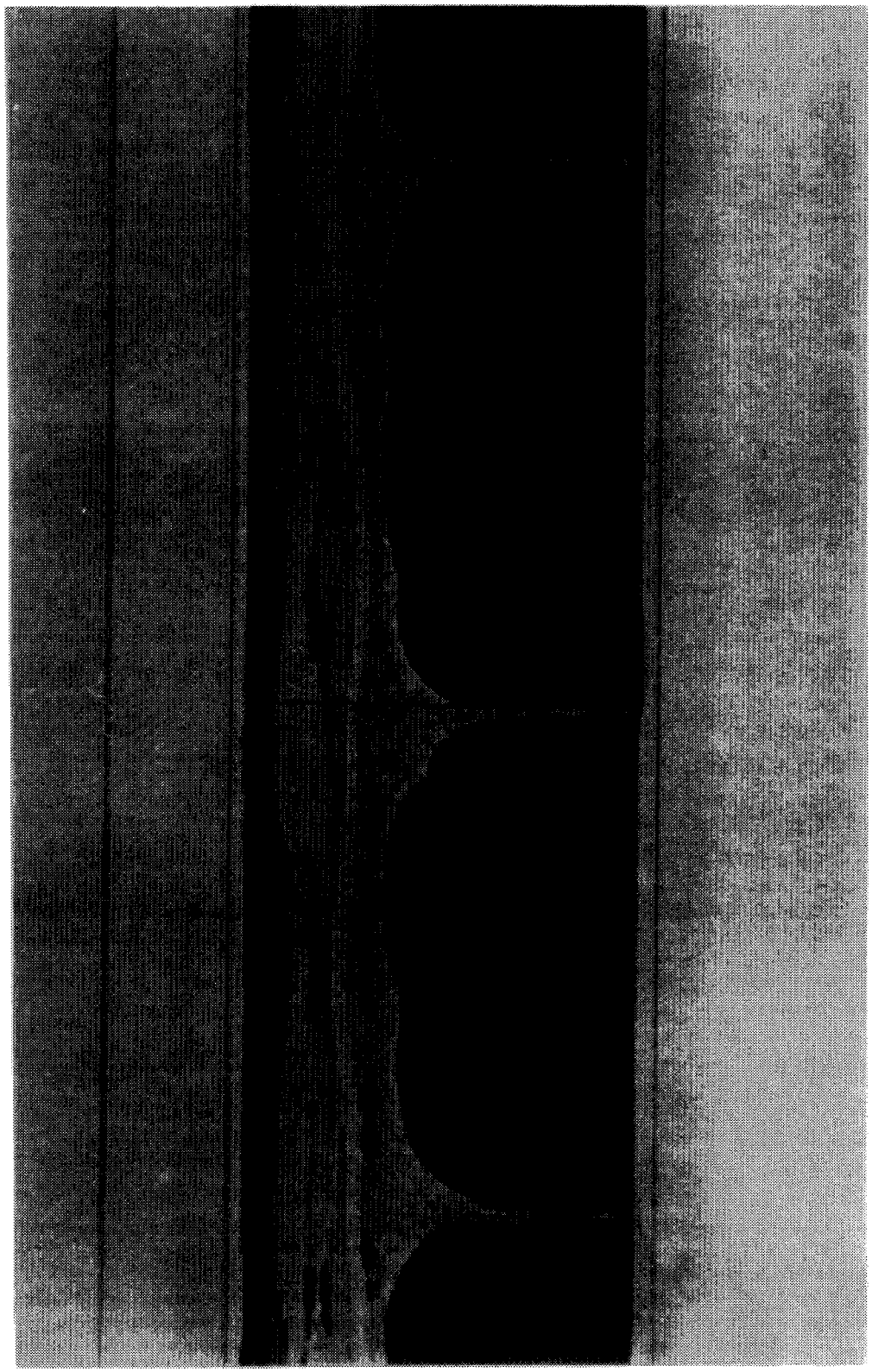
FIG. 4 is a photomicrograph of a cross-section of the honeycomb sandwich panel prepared in Comparative Example 1 after polishing.

A honeycomb panel was fabricated laying-up this prepreg and a photomicrograph of a polished cross-section thereof was taken, which is shown in FIG. 4. Pores are observed in the substantial area of the interlayer zones and the porosity P was 3.0%.

Twenty of the thus prepared prepregs were laid-up in the same direction and the resulting laminate was cured. The toughness $G_{IC}$ of the obtained cured plate was measured by the double cantilever method, which was 3.5 pounds/inch.

Two of the prepreg were laid-up and the laminate was cured. The resulting cured plate was tested for its burn-through characteristics. The cured plate was placed on a tripod and heated with a gas burner under the cured plate. The time required for the flame to penetrate the plate was measured, which was 130 seconds.

EXAMPLE 2

An epoxy resin composition having the following composition was prepared in a kneader. The resin composition was heated at 80° C. for a short time and coated on a releasing paper to obtain a resin film. The weight of the resin paper was 40 g/m$^2$.

Epoxy Resin Composition for First Step Impregnation

<Epoxy Resin>

| | |
|---|---|
| Brominated bisphenol A type Solid Epoxy (EPC152) | 13.7 parts |
| Bisphenol A type Liquid Epoxy (YD 128) | 20.3 parts |
| Tetraglycidyldiaminodiphenyl methane (ELM 434) | 17.3 parts |
| Bisphenol F type Liquid Epoxy (EPC830) | 16.7 parts |
| <Curing Agent> | |
| 4,4'-DDS (4,4'-diaminodiphenylsulfone) | 23.5 parts |
| BF$_3$.MEA (BF$_3$ monoethylamine complex) | 0.5 parts |
| <Solid Rubber> | |
| Hycar1072(Carboxy-terminated solid acrylonitrile-butadiene rubber) | 7.0 parts |

-continued

| <Thermoplastic Resin> | |
|---|---|
| Hydroxyl-terminated polyether sulfone (PES100P) | 1.0 part |
| | Total 100.0 parts |

This resin film was set in a prepreg machine and the first impregnation step was carried out by impregnating the resin composition into a plain-woven fabric made of carbon fibers (TORAYCA C07373, commercially available from TORAY INDUSTRIES, INC.) from both sides of the fabric. The impregnation temperature was 130° C. and the impregnation linear pressure was 1400 kg/cm². The resin content $W_R$ of the intermediate prepreg obtained in this first impregnation step was 29%. In spite of the high impregnation pressure, the resin was not pressed out and an intermediate prepreg having the prescribed resin content was obtained.

A resin composition for the second impregnation step, which had the same composition as that for the first impregnation step was coated on a releasing paper to obtain a resin film having a weight of 25 g/m². The second impregnation step was carried out by impregnating the intermediate prepreg obtained in the first impregnation step with the resin composition from both sides of the prepreg under heat. The impregnation temperature was 100° C. and the impregnation linear pressure was 690 kg/cm². A prepreg having a resin content $W_R$ of 40% was obtained. The thus obtained final prepreg had excellent impregnation property, tackiness and drapability. The cover factor $K_p$ of the thus obtained final prepreg was 98%.

A honeycomb panel was fabricated laying-up this prepreg and a photomicrograph of a polished cross-section thereof was taken. Pores were not substantially observed in the interlayer zones and the porosity P was 0.04%.

COMPARATIVE EXAMPLE 2

Using the epoxy resin composition used in Example 2, a prepreg was prepared by a single impregnation step.

That is, the epoxy resin composition was heated at 80° C. for a short time and was coated on a releasing paper to obtain a resin film having a weight of 65 g/m². This resin film was set in a prepreg machine and impregnation was carried out in a single step by impregnating the resin composition into a plain-woven fabric made of carbon fibers (TORAYCA C07373, commercially available from TORAY INDUSTRIES, INC.) from both sides of the fabric. The impregnation temperature was 120° C. and the impregnation linear pressure was 1400 kg/cm². When the resin composition was pressed to the reinforcing fabric under a high pressure, the resin was pressed out, so that the obtained prepreg had a resin content $W_R$ of only 34%. The cover factor $K_p$ of this prepreg was 95%.

COMPARATIVE EXAMPLE 3

A prepreg was prepared by the same process as in Comparative Example 2 except that the impregnation linear pressure was 900 kg/cm². When the resin composition was pressed to the reinforcing fabric, the resin was not pressed out and a prepreg having a resin content $W_R$ of 40% was obtained. The cover factor $K_p$ of this prepreg was 98%.

A honeycomb panel was fabricated laying-up this prepreg and a photomicrograph of a polished cross-section thereof was taken. Pores were observed in substantial parts of the interlayer zones and a number of pores were observed in the resin layer, which are considered to be formed due to the insufficient impregnation of the resin. The porosity P was 1.5%.

COMPARATIVE EXAMPLE 4

Using the resin composition used in Example 2, a prepreg was prepared by a two-step impregnation process. The resin composition formulated in a kneader was heated at 80° C. for a short time and was coated on a releasing paper to obtain a resin film having a weight of 40 g/m². This resin film was set in a prepreg machine and a first impregnation step was carried out by impregnating the resin composition into a plain-woven fabric made of carbon fibers (TORAYCA C07373, commercially available from TORAY INDUSTRIES, INC.) from both sides of the fabric. The impregnation temperature was 130° C. and the impregnation linear pressure was 690 kg/cm². The resin content $W_R$ of the thus obtained intermediate prepreg obtained by this first impregnation step was 29%.

The epoxy resin composition having the same composition as that used in the first impregnation step was coated on a releasing paper to obtain a resin film for the second impregnation step, having a weight of 25 g/m². The intermediate prepreg obtained by the first impregnation step was impregnated with the epoxy resin composition to carry out the second impregnation step. The impregnation linear pressure was 690 kg/cm² which was the same as that in the first impregnation step, and the impregnation temperature was 100° C. A final prepreg having a resin content $W_R$ of 40% was obtained. The cover factor $K_p$ of this prepreg was 98%.

A honeycomb panel was fabricated laying-up this prepreg and a photomicrograph of a polished cross-section thereof was taken. Pores were observed in substantial parts of the interlayer zones and a number of pores were observed in the resin layer, which are considered to be formed due to the insufficient impregnation of the resin. The porosity P was 2.5%.

REFERENCE EXAMPLE 1

Using "TORAYCA" T300 yarns (average number of twisting: 0.8 turns/m, average diameter of single fiber: 7 μm, average number of fibers per yarn: 3000, fineness: 1800 denier, specific gravity: 1.76) as warps and woofs, a woven fabric was prepared by plain weaving. The widths of each warp and woof were 1.47 mm and 1.49 mm, respectively, and the size of the meshes was 0.57 mm and 0.59 mm in the directions of warp and woof, respectively. The weaving densities in the warp and woof directions were both 4.85 yarns/cm (warp pitch: about 2.06 mm). The weight of the fabric was 194 g/m² and the thickness of the fabric was 0.31 mm.

The above-described woven fabric was made to run in the warp direction at a rate of 1.5 m/min and the opening, width-enlarging and flattening operation of the yarns was performed by using water jets. The diameter of the nozzle was 0.13 mm, the nozzle pitch was 0.6 mm and the beating force per one water jet was 0.6 gf.

In the thus treated woven fabric, the yarns were well opened and the widths of the warps and woofs were enlarged to 1.71 mm and 1.91 mm, respectively. The thickness was 0.28 mm, and the cover factor $K_c$ was 99%. The obtained woven fabric was thin and the irregularities in the surface were very small. Further, cutting of single fibers and generation of down were not observed.

EXAMPLE 3

An epoxy resin composition having the following composition was prepared in a kneader.

| <Epoxy Resin> | |
|---|---|
| Brominated bisphenol A type Solid Epoxy (EPC152) | 63.0 parts |
| Bisphenol A type Liquid Epoxy (EPC828) | 127.0 parts |
| Tetraglycidyldiaminodiphenyl methane (ELM 434) | 40.0 parts |
| Bisphenol F type Liquid Epoxy (EPC830) | 20.0 parts |
| <Curing Agent> | |
| 4,4'-DDS (4,4'-diaminodiphenylsulfone) | 80.0 parts |
| <Solid Rubber> | |
| Carboxy-terminated solid NBR (NIPOL 1072) | 25.0 parts (7.0 wt %) |

During the process of heating this resin composition from 50° C. at a rate of 1.5° C./min, the complex coefficient of viscosity $\eta_{0.5}$ measured at 80° C. under a vibration frequency of 0.5 Hz was 700 poise and the minimum complex coefficient of viscosity $\eta_{min}$ was 90 poise.

This resin composition was heated at 80° C. for a short time and was coated on a releasing paper to obtain a resin film.

This resin film was set in a prepreg machine and impregnation of the resin was performed from the both sides of the carbon fiber woven fabric prepared in Reference Example 1. The impregnation temperature was 100° C. and the impregnation pressure was 4 kgf/cm² to obtain a prepreg with a resin content of 40%, having excellent tackiness and drapability were obtained. The cover factor $K_p$ of this prepreg was 99%. This prepreg was cured in a hot air oven by heating the prepreg to 180° C. at a rate of 0.5° C./hour. A photomicrograph of a polished cross-section of the cured prepreg was taken and the void content B was measured, which was 0.15%.

One prepreg thus obtained was placed on an aluminum plate to which a silicone-based releasing agent was applied. On the prepreg, another prepreg was placed such that the direction of warps of the reinforcing fabric of the prepreg was shifted by 45° from the direction of warps of the reinforcing fabric of the first placed prepreg. On the second prepreg, a honeycomb core made of aramide paper impregnated with a thermally resistant phenol resin, having a size of the inner space of the cells of ⅛ inch (about 3.2 mm) and having a thickness of ½ inch (about 12.7 mm) was placed. On the honeycomb core, the above-described two prepregs were laminated in the direction such that their reinforcing fabrics constitute the mirror image of the reinforcing fabrics of the above-mentioned first two prepregs under the honeycomb core. The entire structure was packed in a fluorine-contained resin film.

The resulting packed structure was placed in an autoclave and was heated to 180° C. at a rate of 1.5° C./min under a pressure of 3 kgf/cm² while reducing the pressure in the pack. The structure was left to stand at this temperature for two hours to cure the epoxy resin of the cloth prepreg to form skins and to adhere the skins with the honeycomb core.

Figure 5:
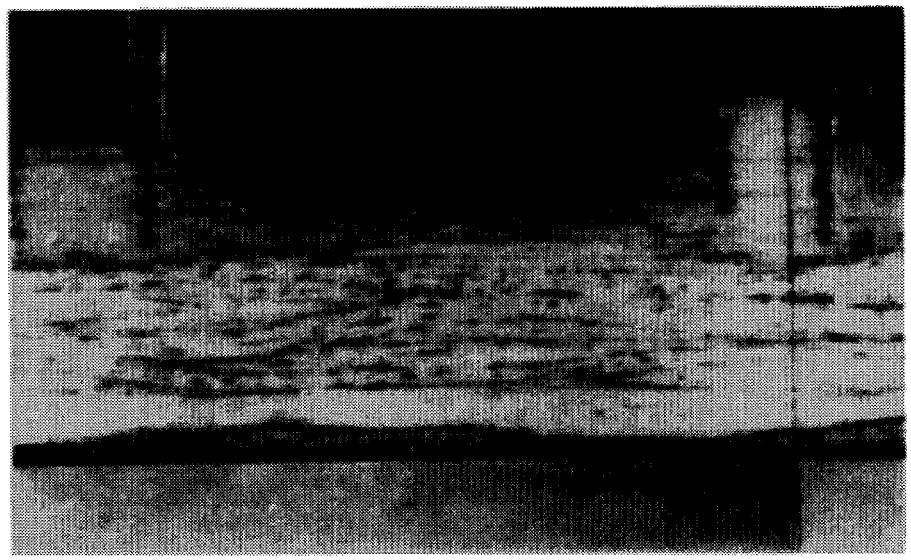
FIG. 5 is a photomicrograph of a cross-section of the honeycomb sandwich panel prepared in Example 3 after polishing.
Figure 6:
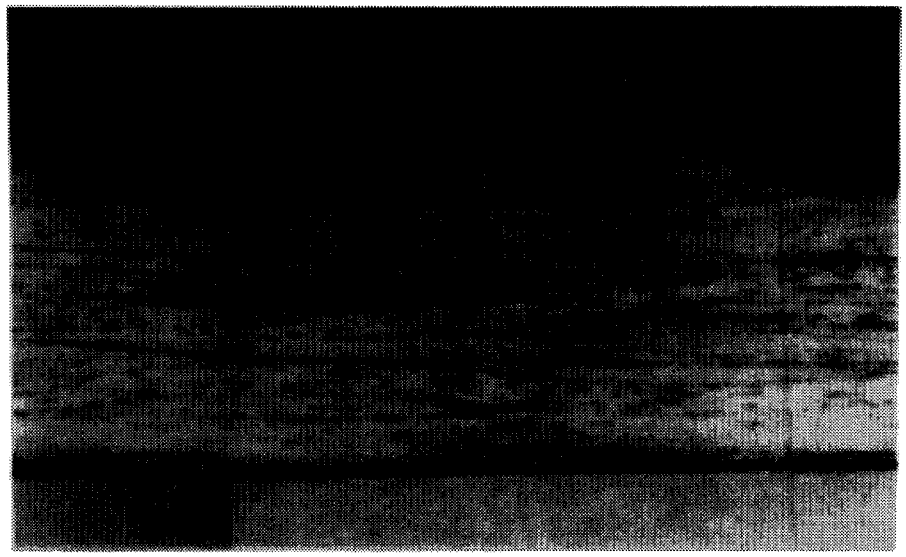
FIG. 6 is a photomicrograph of a cross-section of the honeycomb sandwich panel prepared in Comparative Example 7 after polishing.

A cross-section of the thus obtained honeycomb sandwich panel was observed with a microscope, which is shown in FIG. 5. The porosity P was 0.01%.

COMPARATIVE EXAMPLE 5

The same procedure as in Example 3 was repeated except that carbon fiber woven fabric "C07373Z" of which yarns are not opened was used as the reinforcing fabric. The cover factor $K_p$ was 96%. The porosity P of the obtained composite was 0.3%, which is inferior to that attained in Example 3.

COMPARATIVE EXAMPLE 6

The same procedure as in Example 3 was repeated except that 12% by weight of a solid NBR "NIPOL 1072" was used. The cover factor $K_p$ of the obtained prepreg was 99%. Although the minimum complex coefficient of viscosity $\eta_{min}$ was raised to 500 poise, the complex coefficient of viscosity $\eta_{0.5}$ at 80° C. was 2500 poise, so that the void content B was as much as 0.8%. As a result, the porosity P of the obtained composite was 0.5%, which was inferior to that attained in Example 3.

COMPARATIVE EXAMPLE 7

The same procedure as in Example 3 was repeated except that 3% by weight of a solid NBR "NIPOL 1072" was used. The cover factor $K_p$ of the obtained prepreg was 99%. Since the complex coefficient of viscosity $\eta_{0.5}$ at 80° C. was as low as 350 poise, the void content B was as much as 0.8%. The minimum complex coefficient of viscosity was as low as 15 poise, so that the porosity P of the composite was 0.4%, which was inferior to that attained in Example 3. A photomicrograph of a cross-section of the honeycomb sandwich panel is shown in FIG. 4.

The results of Example 3 and Comparative Examples 5–7 are shown in Table 1.

EXAMPLE 4

Preparation of Reinforcing Fabric

To a twisted yarn made of carbon fibers, 0.8% by weight of an epoxy-based sizing agent was applied and the resultant was dried. The yarn was then untwisted to 0.8 turns/m. The average diameter of the carbon fibers was 7 μm, the number of fibers per yarn was 3,000, the fineness of the yarn was 1,800 denier and the specific gravity of the yarn was 1.76. This yarn is commercially available from TORAY INDUSTRIES, INC., under the trademark of TORAYCA T300. Using TORAYCA T300 as warps and woofs, a plain-woven fabric was prepared. The widths of the warps and woofs were 1.47 mm and 1.49 mm, respectively. The sizes of the mesh in the warp and woof directions were 0.57 mm and 0.59 mm, respectively. The weaving densities in both the warp and woof directions were 4.85 yarns/cm (warp pitch: about 2.06 mm). The weight of the fabric was 194 g/m² and the thickness was 0.31 mm.

The thus obtained fabric was subjected to the opening, width-enlarging and flattening operation while moving the fabric in the warp direction at a rate of 1.5 m/min as shown in FIG. 1. A nozzle apparatus having nozzle holes with a diameter of 0.13 mm and with a nozzle pitch of 0.6 mm was used. The punching force per one water jet was 0.6 gf.

In the resulting fabric, the fibers were well opened and the warps and woofs were enlarged and flattened to widths of 1.71 mm and 1.91 mm, respectively. The thickness of the fabric was 0.28 mm and the cover factor was about 99%. Thus, the fabric was thin and the irregularities in the surface were very small. Further, breakage of fibers and generation of nap were not observed.

COMPARATIVE EXAMPLE 8

The same procedure as in Example 4 was repeated except that the punching force per one jet water was 4.5 gf. In the obtained fabric, frequent breakage of the fibers was observed and the fabric looked like a non-woven fabric made of short fibers.

EXAMPLE 5

Using the yarn made of carbon fibers used in Example 1, a plain-woven fabric was prepared. The widths of the warps and woofs were 1.60 mm and 1.49 mm, respectively. The sizes of the mesh in the warp and woof directions were 1.37 mm and 1.26 mm, respectively. The weaving densities in both the warp and woof directions were 3.5 yarns/cm (warp pitch: about 2.86 mm). The weight of the fabric was 140 g/m² and the thickness was 0.29 mm.

The thus obtained fabric was subjected to opening, width-enlarging and flattening operation as in Example 1. In the resulting fabric, the warps and woofs were enlarged and flattened to widths of 2.17 mm and 2.09 mm, respectively. The thickness of the fabric was 0.23 mm and the cover factor was about 96%. Thus, the fabric was thin and the irregularities in the surface were very small. Further, breakage of fibers and generation of nap were not observed.

EXAMPLE 6

The fabric prepared in Example 5 was impregnated with a phenol resin at B stage to obtain a prepreg. The content of the phenol resin in the prepreg was 44% by weight.

Six plies of the thus obtained prepreg were stacked aligning the directions of the warps and the laminate was heated at 170° C. for one hour at a pressure of 7 kg/cm² to obtain a CFRP plate with a thickness of 1.03 mm. The content by volume of the carbon fibers in the thus obtained CFRP plate was 46.5%.

Observation of the obtained CFRP plate revealed that the carbon fibers were well dispersed and no portions containing excess resin and no voids existed.

A test strip having a width of 25 mm and a length of 230 mm was cut out from the obtained CFRP plate and the test strip was subjected to the tensile strength tests according to JIS K7073. The test results are as follows:

Tensile Strength: 48.5 kg/mm²

Tensile Elongation: 5480 kg/mm²

Tensile Breaking Strain: 0.94%

Tensile Proportional Limit Strain: 0.94%

COMPARATIVE EXAMPLE 9

A prepreg was prepared in the same manner as in Example 6 except that the fabric described in Example 5 before the opening, width-enlarging and flattening operation was used, and a CFRP was prepared therefrom also in the same manner as in Example 6. The thus obtained CFRP plate had a thickness of 1.06 nm and a content by volume of carbon fibers of 45.1%.

Large portions having excess resin were observed at the meshes and large voids which can be observed even with naked eyes were observed in the vicinities thereof.

The thus obtained CFRP plate was subjected to the same tensile tests as in Example 6. The test results are as follows:

Tensile Strength: 47.5 kg/mm²

Tensile Elongation: 5460 kg/mm²

Tensile Breaking Strain: 0.95%

Tensile Proportional Limit Strain: 0.60%

When compared with the prepreg prepared in Example 6, this prepreg was thicker and the content by volume of the carbon fibers was smaller than that of the prepreg of Example 6 in spite of the fact that the content of the phenol resin in the prepreg was the same. Although the tensile strength, tensile elongation and tensile breaking strain were not very different from those of the prepreg of Example 6, the tensile proportional limit strain was 0.60%. This means that the linearity between stress and strain is lost before the final rupture. In contrast, with the prepreg prepared in Example 6, the tensile proportional limit strain was 0.94%, which means that the linearity between stress and strain is kept up to the final rupture.

TABLE 1

|  | Example 3 | Comparative Example 5 | Comparative Example 6 | Comparaive Example 7 |
|---|---|---|---|---|
| Type of Carbon Fiber Fabric | Opened | Non-opened | Opened | Opened |
| Amount of "NIPOL 1072" Added (%) | 7 | 7 | 12 | 3 |
| Viscosity at 80° C. (poise) | 700 | 700 | 2500 | 350 |
| Minimum Viscosity (poise) | 90 | 90 | 500 | 15 |
| Void Content B (%) in Prepreg | 0.15 | 0.6 | 0.8 | 0.1 |
| Porosity P (%) of Composite | 0.01 | 0.3 | 0.5 | 0.4 |

We claim:

1. A cloth prepreg comprising:

(a) a thixotropic resin composition, said resin composition comprising an epoxy resin, a curing agent and a solid elastomer; and (b) a woven fabric made of reinforcing fibers, the meshes of said woven fabric having been flattened to increase the cover factor of the fabric such that said prepreg has a cover factor $K_p$ of 97–99.9% wherein said solid elastomer is either not cross-linked or only lightly cross-linked such that the elastomer is swollen by the epoxy resin.

2. The cloth prepreg of claim 1, wherein said solid elastomer is an acrylonitrile-butadiene elastomer.

3. The cloth prepreg of claim 2, wherein said acrylonitrile-butadiene elastomer has a functional group.

4. The cloth prepreg of claim 3, wherein said functional group is a carboxylic acid group.

5. The cloth prepreg of claim 1, wherein said solid rubber is a lightly cross-linked acrylonitrile-butadiene elastomer.

6. The cloth prepreg of claim 1, wherein said resin composition has a complex coefficient of viscosity $\eta_{0.02}$ determined at 80° C. under a vibration frequency of 0.02 Hz of not less than 5000 poise, and a complex coefficient of viscosity $\eta_2$ determined at 80° C. under a vibration frequency of 2 Hz and said complex coefficient of viscosity $\eta_{0.02}$ satisfy the equation of:

$$\log \eta_{0.02} - \log \eta_2 \geq 0.5.$$

7. The cloth prepreg of claim 1, wherein said resin composition further comprises polyether sulfone.

8. The cloth prepreg of claim 1, wherein said curing agent is at least one selected from the group consisting of aromatic amine curing agents, acid anhydride curing agents, dicyandiamide curing agents and novolak curing agents.

9. The cloth prepreg of claim 1, wherein said solid elastomer is lightly cross-linked and is dispersed in the resin composition so as to attain micro-phase separation.

10. The cloth prepreg of claim 3, wherein said resin composition has a complex coefficient of viscosity $\eta_{0.5}$ determined at 80° C. under a vibration frequency of 0.5 Hz during heating from 50° C. at a rate of 1.5° C./min of 100–1500 poise, and has a minimum complex coefficient of viscosity $\eta_{min}$ determined at 80° C. under a vibration frequency of 0.5 Hz during heating from 50° C. at a rate of 1.5° C./min of 50–300 poise.

11. The cloth prepreg of claim 3, wherein said woven fabric has warps and woofs made of multifilament yarns made of carbon fibers, the widths W (mm) and finenesses D (d:denier) of said warp and woof satisfying the equation of:

$$W = k \cdot (D/\rho)^{5/9}$$

(wherein k represents $3.5 \times 10^{-2} - 10.0 \times 10^{-2}$ (mm·d$^{-5/9}$) and $\rho$ represents specific gravity of said carbon fibers), and wherein said woven fabric has a cover factor $K_c$ of 90.0–99.8%.

12. The cloth prepreg of claim 1, comprising two different resin compositions having different coefficients of viscosity, which constitute an inner layer and a surface layer, the resin composition constituting said surface layer having a complex coefficient of viscosity $\eta_{0.02}$ determined at 80° C. under a vibration frequency of 0.02 Hz of 40,000–400,000 poise, the resin composition constituting said inner layer having a complex coefficient of viscosity $\eta_{0.02}$ determined at 80° C. under a vibration frequency of 0.02 Hz of not less than 5000 poise and less than 40,000 poise.

13. The cloth prepreg of claim 12, wherein both of said resin compositions comprise an epoxy resin, a curing agent selected from the group consisting of aromatic amine curing agents, acid anhydride curing agents, dicyandiamide curing agents and novolak curing agents, and a solid elastomer, the resin constituting said surface layer further comprising polyether sulfone.

14. The cloth prepreg of claim 1, wherein the area occupied by voids in any given cross-section of the prepreg is not more than 0.5%.

15. A prepreg comprising a reinforcing fabric comprising warps and woofs which are multifilament yarns made of carbon fibers, which are twisted to not more than 5 turns/m, with the widths W (mm) and finenesses D (d:denier) of said warps and woofs satisfying the equation:

$$W = k \cdot (D/\rho)^{5/9}$$

wherein k represents $3.5 \times 10^{-2} - 10.0 \times 10^{-2}$ (mm·d$^{-5/9}$) and $\rho$ represents specific gravity of said carbon fibers, said woven fabric having a cover factor $K_c$ of 90.0–99.8% and each of said warps comprises not less than 3,000 fibers, and a thermosetting matrix resin.

16. The prepreg according to claim 15, wherein said thermosetting matrix resin is selected from the group consisting of epoxy resins, unsaturated polyester resins, phenol resins, polyimide resins and bismaleimide resins.

* * * * *